Nov. 17, 1925.  
W. SHELDON  
1,562,372  
FLUSH JOINT PIPE  
Filed April 15, 1925
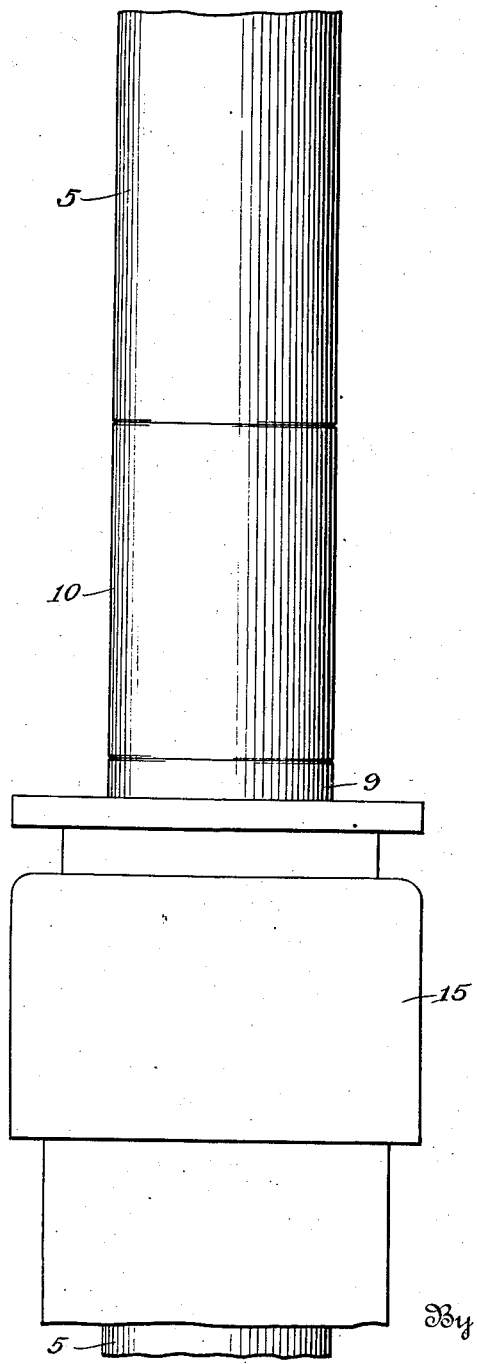
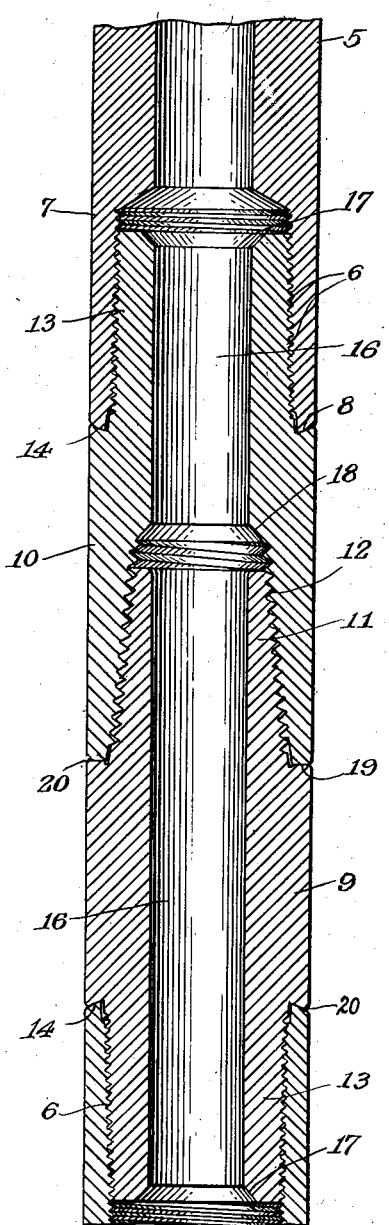
Inventor  
Waldo Sheldon  
By his Attorney  
Philip S. McLean.

Patented Nov. 17, 1925.

1,562,372

UNITED STATES PATENT OFFICE.

WALDO SHELDON, OF SOUTH NORWALK, CONNECTICUT.

FLUSH-JOINT PIPE.

Application filed April 15, 1925. Serial No. 23,262.

*To all whom it may concern:*

Be it known that I, WALDO SHELDON, a citizen of the United States, and a resident of South Norwalk, county of Fairfield, and State of Connecticut, have invented certain new and useful Improvements in Flush-Joint Pipes, of which the following is a specification.

This invention relates to drill pipe, and the objects of the invention are to provide a combined tool joint and coupling for such pipe which will not interfere with the passage of the pipe through stuffing boxes and the like, which will not obstruct or materially restrict the flow through the pipe, which will be strong and durable and which will stand the wear and tear of coupling and uncoupling the pipe sections and tools.

In the drawing accompanying and forming part of this specification, a simple practical embodiment of the invention is illustrated, wherein the foregoing and other objects are attained.

Figure 1 in this drawing is an outside view of the joint shown as about to pass through a stuffing box in a well casing.

Figure 2 is a central vertical sectional view of the joint.

In this invention the sections of drill pipe 5, instead of being externally screw threaded as usual, are provided with internal screw seats 6 in the somewhat thickened end portion 7. The ends of these pipe sections are shown tapered or beveled at 8 on a convex curve.

The tool joint and coupling is completed by two coupling members 9, 10, the first having a tapered screw threaded stem 11 and the second having a tapered screw socket 12 receiving the stem and both having at their opposite ends, the screw threaded shanks 13 fitting the screw sockets in the ends of the pipe sections. At the bases of the screw shanks, relatively deep undercut shoulders 14 are provided to engage over the tapered ends of the pipe sections, these shoulders being shown as concavely curved to substantially fit the curvature on the edges of the pipe.

The screw threads of the stem and socket are relatively course as compared to the screw threaded joints between the coupling members and pipe sections and the taper of these latter screw connections is relatively slight so that when the coupling members are turned down tight in the ends of the pipe sections, said members will be held therein when the pipe sections are relatively turned to break the joint at the coupling members. In seating the coupling members in the ends of the pipe sections, the undercut shoulders engage over the tapered ends of the pipe sections and so resist and control the spreading tendency exerted on the pipe. The exposed body portions of the coupling members, including the overstanding shoulders are substantially cylindrical and flush with the outer pipe surfaces so as to be coextensive therewith and hence capable of passing through a stuffing box 15 or other device uninterruptedly along with the pipe.

The coupling members are formed with coextensive passages 16 therethrough in continuation of the bore through the pipe and the entrances to these bores may be tapered as indicated at 17. A taper also may be provided at the inner end of the screw socket in the coupling member 10 as indicated at 18.

The screw shanks of the coupling members are relatively long as indicated so that a good strong connection with the pipe sections is assured. The coupling elements are readily applied to the piping and the simple act of setting them up tight makes them in effect a unitary part of the pipe, the interlocking engagement of the undercut shoulders over the tapered pipe ends assisting in this holding action as well as preserving the uniformity of diameter. It has furthermore been found that this particular tool joint and coupling so increases the strength of the drill pipe that it is possible to use a smaller size drill pipe than has been used heretofore for the same work.

The coupling members are shown as having abrupt engaging shoulders 19 at their meeting ends forming stops limiting engagement of the tapered stem in its socket and the exposed edges at these shoulders and at the undercut shoulders are shown as relieved or cut away slightly at 20 to leave no sharp edges which if present might be injured in the ordinary handling of the tool joint and pipe. The relieving of these shoulders also facilitates passage of the joints through the stuffing box.

What is claimed is:

A tool joint for well drilling comprising sections of drill pipe having thickened reinforced ends screw threaded internally on a slight taper and terminating in beveled end edges, cooperating joint members having slightly tapered externally screw threaded shanks screwed fast in the internally threaded reinforced ends of the drill pipe sections, said members being provided with undercut shoulders at the bases of the shanks of the same engaged fast over the beveled edges of the pipe sections to prevent spreading of the pipe sections and to interlock the members securely in the ends of the pipe sections, one of said joint members having a projecting tapered stem and the other joint member having a tapered socket receiving the stem, said stem and socket having engaging screw threads coarser than the screw threads of the shanks and drill pipe sections and the taper of said stem and socket being materially greater than the taper of the shanks and screw seats in the pipe sections, insuring separation of the tool joint at the stem and socket, said joint members having alined passages extending entirely therethrough in continuation of the bore of the drill pipe, the ends of the drill pipe sections and the over-engaging shoulders of the coupling members being substantially flush with the external surface of the drill pipe and the joint members being substantially coextensive with the drill pipe to enable the entire tool joint to pass through a stuffing box or the like intact along with the drill pipe.

In witness whereof, I have hereunto set my hand this 20th day of January, 1925.

WALDO SHELDON.